United States Patent
Navada et al.

(10) Patent No.: US 6,842,791 B2
(45) Date of Patent: Jan. 11, 2005

(54) METHOD AND APPARATUS FOR MEMORY EFFICIENT FAST VLAN LOOKUPS AND INSERTS IN HARDWARE-BASED PACKET SWITCHES

(75) Inventors: Muraleedhara H. Navada, Santa Clara, CA (US); Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 10/103,470

(22) Filed: Mar. 20, 2002

(65) Prior Publication Data

US 2003/0214956 A1 Nov. 20, 2003

(51) Int. Cl.[7] .............................................. G06F 13/00
(52) U.S. Cl. ............................. 710/1; 710/20; 710/22; 710/36; 710/37; 710/39; 710/52
(58) Field of Search ............................. 710/20, 22, 36, 710/37, 39, 52, 1

(56) References Cited

U.S. PATENT DOCUMENTS

| | | | | |
|---|---|---|---|---|
| 5,386,532 A | * | 1/1995 | Sodos | ......................... 710/22 |
| 5,386,578 A | * | 1/1995 | Lin | ............................. 712/300 |
| 6,032,207 A | * | 2/2000 | Wilson | ......................... 710/54 |
| 6,034,958 A | | 3/2000 | Wicklund | |
| 6,091,707 A | | 7/2000 | Egbert et al. | |
| 6,601,150 B1 | * | 7/2003 | Scheinbart et al. | ......... 711/156 |

FOREIGN PATENT DOCUMENTS

EP           1 130 855 A2     9/2001

OTHER PUBLICATIONS

Yu D. et al., "Forwarding Engine For Fast Routing Lookups and Updates", 1999 IEEE Global Telecommunications Conference–Globecom, Rio De Janeiro, Brazil, High Speed Networks XP–001016965, pp. 1556–1564.

* cited by examiner

*Primary Examiner*—Jeffrey Gaffin
*Assistant Examiner*—Mohammad O. Farooq
(74) *Attorney, Agent, or Firm*—Blakely, Sokoloff, Taylor & Zafman LLP (57) ABSTRACT

A technique for decreasing VLAN lookup times in hardware-based packet switches by emulating the functionality of a content addressable memory (CAM) with software and random access memories (RAM). The decrease in lookup time is achieved by using content from the data packet to index directly into a table that stores forwarding information. Since the forwarding information is addressed directly by content from the packet, the need to spend time and resources sorting through the table of forwarding information with a key search is eliminated.

23 Claims, 8 Drawing Sheets

Insert a data entry associated with a key into a data entry location in a first memory.
800

Insert a pointer to the data entry in a pointer location in a second memory.
802

Change a validity bit in the pointer location to indicate the presence of the data entry associated with the key.
804

Fig. 8

Figure 1:
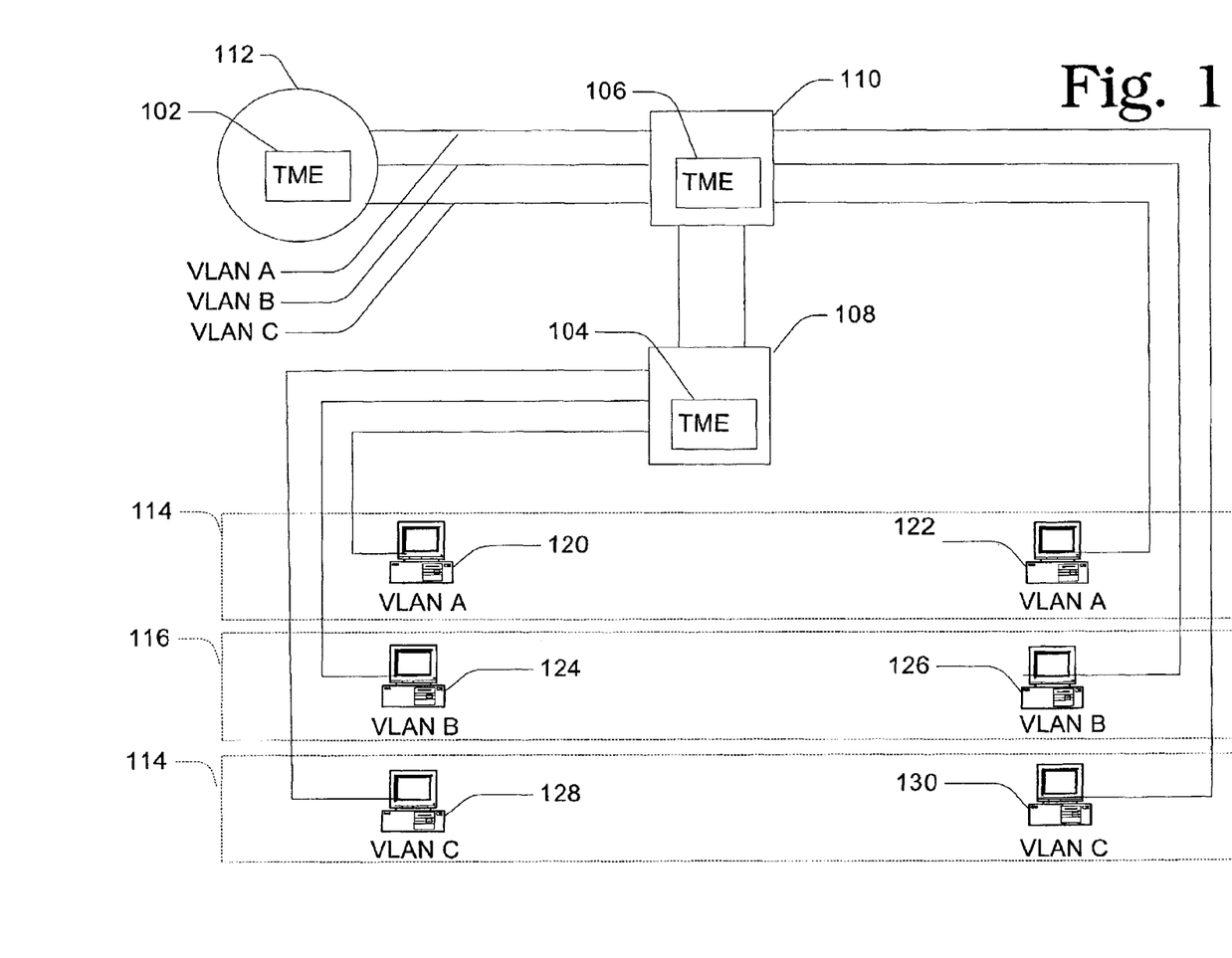
FIG. 1 is a block diagram of an example computing network system employing example table management engines (TMEs), according to a networking embodiment of the invention.

Fig. 9 ately to manage or facilitate fast data searches and related table operations. Switches 108, 110 and router 112 all contain a TME in the example network 100. Some embodiments of TMEs 102, 104, 106, however, may be used in any information storage and retrieval setting that could benefit by fast data accessing and management.

METHOD AND APPARATUS FOR MEMORY EFFICIENT FAST VLAN LOOKUPS AND INSERTS IN HARDWARE-BASED PACKET SWITCHES

TECHNICAL FIELD

The present invention generally relates to the field of data processing and specifically to memory efficient fast VLAN lookups and inserts in hardware-based packet switches.

BACKGROUND

As computing and networking devices become faster, the requirement for speed in the management of data tables challenges conventional approaches. The speed of a key search, for example, in which data associated with a key must be found in a table quickly, has become a critical issue, and sometimes a bottleneck, in many devices and applications. A key may be any piece of data used as an index or search criterion for finding additional data, but in a networking context, keys are typically Internet protocol (IP) addresses, media access control (MAC) addresses, virtual local area network (VLAN) tags, and other network identifiers.

Solutions that accelerate key search speed sometimes depend on the characteristics of the memory used to store the data table being searched. Random access memory (RAM) stores data at a particular location denoted by an address. When the address is supplied to the RAM, the RAM returns the data stored there. To find the correct address, however, either an index of all the keys needs to be sorted and searched for an address associated with the key or all the associated data entries must be searched for a representation of the key and its associated RAM address. There are many algorithms that seek to shorten the search time for an address associated with a key.

One type of hardware memory, content addressable memory (CAM), accelerates the search for a stored data item by retrieving the data based on the content of the data itself, rather than on its address in memory. When data is supplied to a CAM, the CAM directly returns an address where the associated data is found. For many applications, CAM provides better performance than conventional memory search algorithms by comparing desired information against an entire list of stored data entries simultaneously. Hence, CAM is used in applications in which search time is an important issue and must be constrained to very short durations.

Unfortunately, both discrete hardware and integrated circuit CAM implementations can be relatively expensive both in chip area requirements and/or design complexity. In some applications a direct-mapped cache could be used as a substitute for a CAM, but the fully associative characteristic of a CAM—where a data entry can be placed anywhere in the data structure—is lost and undesirable characteristics such as data collisions and unused memory locations are introduced.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention is generally directed to a method and apparatus for memory efficient fast VLAN lookups and inserts in hardware-based packet switches.

In accordance with the teachings of the present invention, a table management engine (TME) is introduced to accelerate data table searches and management. Because so many computing and networking devices store and retrieve data, a TME can improve the data lookup speed and management performance of many types of tables, lists, and databases. For example, in the data communications field, the TME can speed up devices and applications that use address tables, translation tables, filter tables, and/or VLAN rule tables.

Example Context for Implementing Aspects of the Invention

FIG. 1 is a block diagram of an example computing network 100 in which TMEs 102, 104, 106 accelerate the performance of data packet switching and routing. The illustrated example network 100 includes a router 112, two switches 108, 110 and six computing hosts 120–130 communicatively coupled as illustrated. The example computing network 100 is logically divided into VLAN A 114, VLAN B 116, and VLAN C 118. Example network devices, such as the illustrated switches 108, 110 and router 112 typically use internal tables to associate a source address for each data packet received with destination information stored in the tables.

Using VLAN rules as an example of destination information, each VLAN rule may be one or more port and/or destination addresses and/or other packet directing information. Accordingly, each data packet is sent to a proper hardware address and/or an IP address (depending on the device) as directed by a particular VLAN rule. Although the computing network 100 is depicted as one environment affording a context in which TMEs 102, 104, 106 could be implemented, many other environments and uses are possible.

As a computing network 100 routes and directs data packets, one or more TMEs 102, 104, 106 can be situated in the various components that participate in networking, such as in the illustrated router 112 and two switches 108, 110. TMEs 102, 104, 106 could be implemented in hosts 120–130 and clients as well. In fact, TMEs 102, 104, 106 can be used in any part of the computing network 100 where data lookups occur and/or a table of information is kept.

TMEs 102, 104, 106 can enhance the performance and management of the IP address, port address, and hardware address tables in a computing network 100. When a data packet is received in a device that forwards the data packet using the information in the data packet to decide the forwarding, a TME (102, 104, 106) uses content from the data packet to index directly into a table that stores (or is able to store) a data entry corresponding to the data packet. The data entry is used for other data packets that possess the same content or that can be read and/or hashed to supply the same content.

The data entry contains the forwarding information. In other words, content from the data packet is used directly as a memory address for finding the key's associated data entry without further performing a search through a list of keys to find a memory address for the key. In simplest terms, the key content is substantially used as a memory address. TMEs 102, 104, 106 perform this function of addressing memory by content without the addition of known CAM hardware elements.

In the illustrated computing network 100, a data packet from a first host 120 in VLAN A 114 is received at a first switch 108 having a TME 104. The TME 104 reads and/or hashes the data packet for a content, such as the VLAN tag of VLAN A 114. This content corresponds to a location in a table that is set up so that the table locations correspond to various contents obtainable (readable and/or hashable) from data packets. Thus, the content directly provides an address for indexing into the table and obtaining the destination information (or a pointer to the destination information) for the data packet without using a search algorithm to find a memory address corresponding to the content. The destination information may be a VLAN rule having port and address information. The addressing of the table by content is performed without known CAM hardware elements. Using the destination information in the data entry for the key, the data packet is forwarded to the second switch 110 also having a TME 106. The TME 106 addresses its data entry table by content as described above, and directs the data packet to the router 112. The router also possesses a TME 102 which functions as described above. Thus, the data packet is directed and routed through various network devices to reach its final destination, the second host 122 in VLAN A 114. The TMEs 102, 104, 106 provide faster data packet directing than known non-CAM methods, and in the illustrated example, provide the faster VLAN lookups while making more efficient use of memory than known methods that require a search and/or lookup algorithm to find a memory address for each key.

Example Architecture

Figure 2:
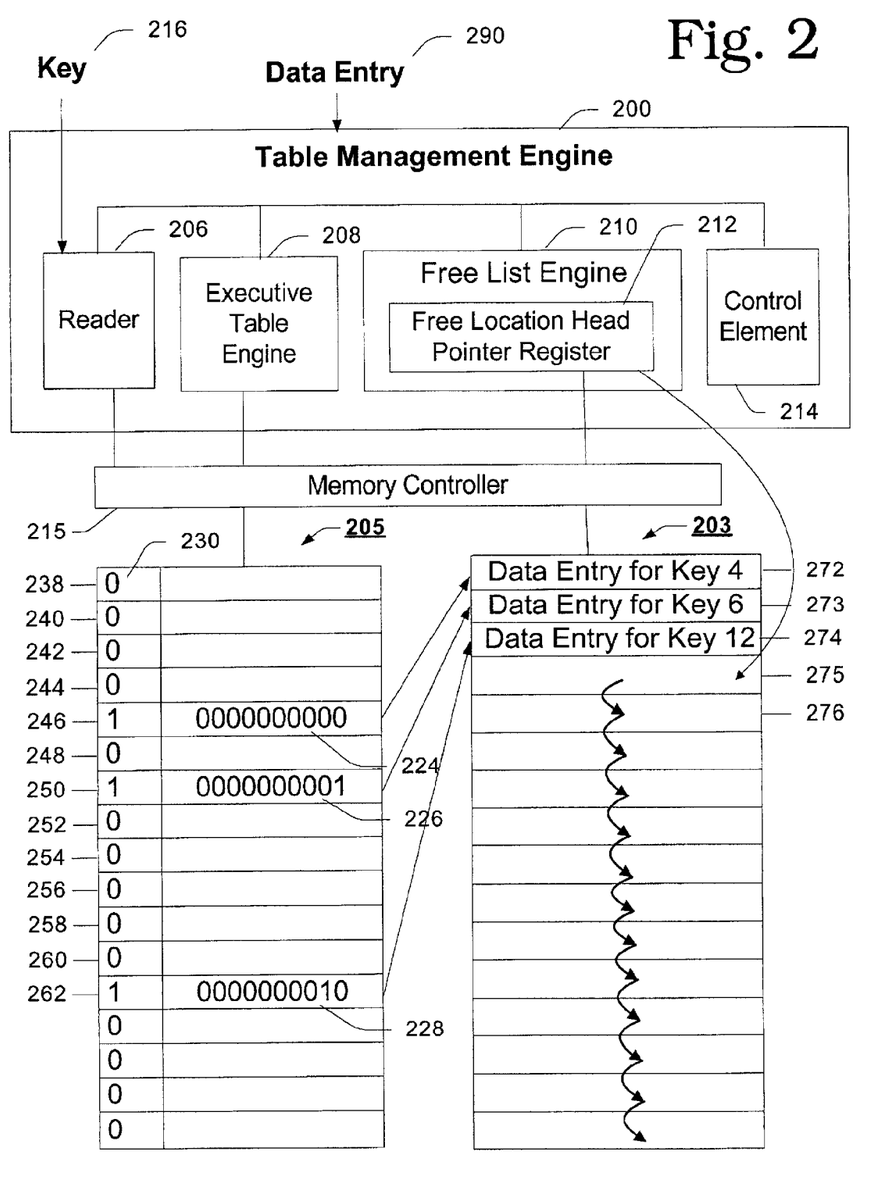
FIG. 2 is a block diagram of an example TME, according to one embodiment of the invention.

FIG. 2 is a block diagram of an example TME 200, according to one implementation of the invention, for accelerating the performance of data tables 203, 205 in one or more memories ("in memory"). An overview of example components is provided to introduce an example architecture. In this embodiment, the TME 200 includes a reader/hasher ("reader") 206, a executive table engine 208, a free list engine 210, a free location head pointer register 212, and a control element 214 communicatively coupled as illustrated. The TME 200 is coupled to a memory controller 215, which is coupled to the tables 203, 205 in memory. More than one memory controller 215 could be used. In this implementation, a first table 203 contains data entries ("data entry table" 203), and a second table 205 contains pointers and validity bits ("pointer table" 205). It should be noted that the table(s) 203, 205 included in or used by a TME 200 can be correctly referred to as either a single table or multiple tables, since they are relational and may be split in different ways and in various different memories or memory parts.

For purposes of explaining aspects of the invention, the first table 203 may also be called the first memory 203 and/or the data entry memory 203. The second table 205 may also be called the second memory 205 and/or the pointer memory 205. Accordingly, a specific location in a table may also be called a memory location. Those skilled in the art will appreciate that these alternate terms for the first table 203 and the second table 205 and specific locations therein are substantially equivalent because tables used in computing and networking devices are commonly implemented in memory. The data entries, pointers, and validity bits in the tables and/or memories may also be stored in different arrangements.

Memory Addressability by Content

Figure 3:
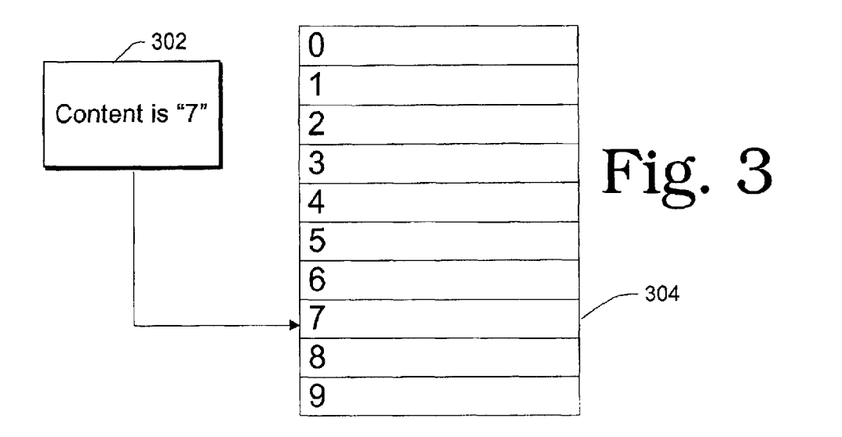
FIG. 3 is a graphical representation of an example memory being indexed and/or accessed according to the content of a key, in accordance with one embodiment of the invention.

The example TME 200 receives data, such as a key 216 and/or a data entry 290. If the application is a computing network 100, the key 216 may be a hardware address, software address, and/or VLAN tag included in the header of a data packet/datagram, but in other non-IP applications the key 216 may be any data. The content that is obtained from the key 216 is used to directly address and/or index into a table/memory location. "Directly" as used here means that no search algorithm is needed to sort through a list and/or index file containing multiple keys or other data entries to relate a memory address stored in the list/index file to the key 216. For example, as illustrated in FIG. 3, an example content value of "7" 302 from a key is substantially the address and/or position of a memory location "7" 304 for the key, thereby providing content addressability to standard types of memory, such as RAM, and avoiding a search through a list of keys, contents, or records.

Returning to FIG. 2, the reader 206 obtains a content from the key 216 using all or part of the data in the key 216. That is, in addition to merely reading the key 216 to obtain its content, the reader 206 may also obtain the content by hashing all or part of the key 216. In this regard, the content determined by the reader 206 does not have to be a literal one-to-one translation of data in the key. The only requirement for the reader 206 and for the content obtained is that the same content is always obtainable from a given key 216. In a networking context, this means that data packets yielding the same content will be directed to the same destination(s). In addition to directly reading and/or hashing the key 216 to obtain content, the content may also be obtained by substituting predetermined content for the actual content read by the reader 206, that is, by bit masking, and/or by other methods that yield a reproducible content from a given key 216.

To further illustrate content addressability according to one aspect of the invention, FIG. 2 is shows a pointer 224 for a key with content "4" at the fourth (counting from "0") location 246 of the second table 205, a pointer 226 for a key with content "6" at the sixth location 250 of the second table 205, and a pointer 228 for a key with content "12" at the twelfth location 262 of the second table 205. It should be noted that unlike the location of a pointer in a table or in memory, the actual value of the pointer (the address that the pointer is pointing to) does not correspond to the content of the key it is associated with, unless coincidentally. Rather, the pointer's address value is directed to a data entry location somewhere in the first table 203.

Figure 4:
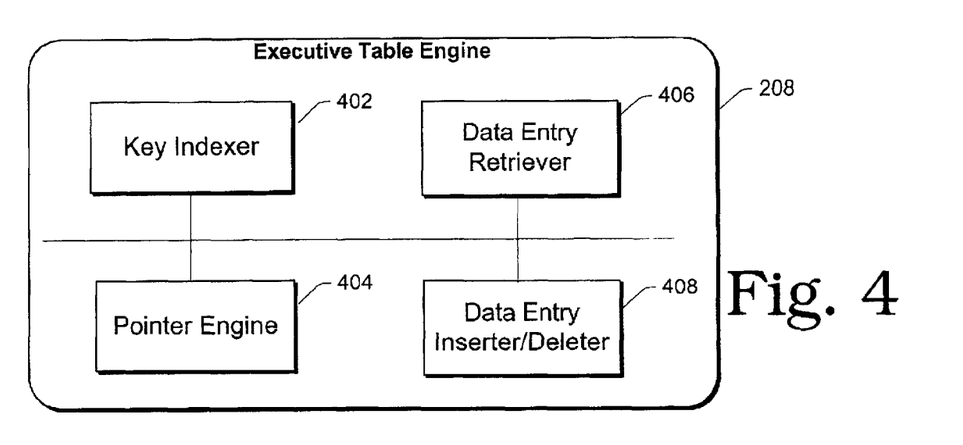
FIG. 4 is a block diagram of an example executive table engine of FIG. 2.

FIG. 4 is a block diagram of an example executive table engine of FIG. 2. A key indexer 402, a pointer engine 404, a data entry retriever 406, and a data entry inserter/deleter 408 are coupled as shown. The key indexer 402 receives a key 216 content from the reader 406, and uses the content to index into the second memory 205. At the memory location 246 corresponding to the content of the key 216, the key indexer reads the validity bit stored there to ascertain whether there is a valid data entry associated with the key 216. The key indexer 402 addresses the second memory 205 directly using the content of the key 216, because the content of the key 216 is substantially the needed memory address.

Using a key content of "4" as an example, the pointer engine 404 establishes a pointer 224 between a newly inserted data entry at memory location 272 and a memory location 246 corresponding to the content "4" of the key 216 in the second memory 205. The pointer 246 established by the pointer engine 404 is the address of the memory location 272 containing the data entry in the first memory 203. During a key deletion operation, the pointer engine 304 also deletes the pointer 224 and sets the associated valid bit to zero.

In some embodiments, the pointer engine 404 also performs the function of setting the validity bit when a pointer operation is carried out, that is, sets the validity bit to indicate the presence or absence of a pointer and therefore a data entry associated with a key 216.

The data entry retriever 406 reads the pointer 224 stored at the memory location 246 provided by the key indexer 402, and follows the pointer 224 to the memory location 272 in the first memory 203, returning the stored data entry.

When the data entry inserter/deleter 408 inserts or deletes a data entry stored in a memory location in the first memory 203 it notifies the pointer engine 404 to add or delete, respectively, the pointer 224 from the second memory 205 and to assign the validity bit at the memory location 246 to reflect the presence or absence, respectively, of the data entry being added or deleted.

VLAN Embodiment

In the context of tables used for IP data communications, an IP address from the header of a data packet/datagram ("packet") is often used as the key 216 to find associated information about the packet, such as a destination port number, the sender's access privileges and location on a network, or applicable VLAN rules. In one example embodiment, the example TME 200 is used as a VLAN rule table or to manage a VLAN rule table.

For example, in Ethernet switches, VLAN rules need to be stored and looked up using the VLAN tags of incoming data packets. A certain number of VLAN rule entries, for example 1K entries, need to be stored and looked up for incoming packets.

The TME 200 can take advantage of the fact that VLAN tags are 12 bits wide to provide the functionality that a VLAN rule and/or address space would have if implemented in a traditional CAM chip, but without the chip area requirements and/or design complexity of CAM hardware. Like a CAM, the TME 200 can utilize all the memory locations in a selected RAM, preventing packet collisions, and emulating the content addressability of a CAM.

Although there may be memory overhead when implementing a VLAN rule table in 20 RAM, such as a 1 K RAM, using the TME 200 as a VLAN rule table and/or VLAN rule table manager is better than using a fixed-size hash structure and/or cache to perform VLAN rule lookups, because the TME 200 provides CAM functionality thus guaranteeing (the example 1 K) address space by preventing packet collisions. The latter feature is critical for chip vendors using the TME 200 who must guarantee that a certain number of entries can be stored.

Referring to FIG. 2, various size RAMs can be selected for the first memory 203 and the second memory 205 when implementing a VLAN rule table using the TME 200. For the first memory 203, a 1 K RAM (or as large a memory capacity as desired) could be used to store the example 1 K VLAN rule entries. For the second memory 205, since 4 K is the usual maximum number of VLAN rule entries needed in a VLAN rule table, a complete 4 K RAM could be used to store a maximum of 4 K pointers and associated validity bits.

For the pointer and the validity bit to be stored in a memory location in the second memory 205, a width of eleven bits is sufficient for a VLAN rule table having a depth of 1 K. Each memory location in the pointer table 205 could have one bit allotted for the validity bit, and ten bits allotted for the pointer. Ten-bit pointers 224, 226, 228 are used in the example, because a binary number having ten bits can represent the desired 1 K (1024 bits) memory locations for the VLAN rule entries in the data entry table 202. The length of the VLAN rule entries can vary and can be accommodated by selecting a wide-enough memory, for example a 200 bit wide memory for correspondingly wide rule entries. Thus, the TME 200 provides a convenient, high-speed, and memory efficient VLAN rule table with all the advantages that a CAM chip would provide without using a CAM chip.

Free List Engine

Referring still to FIG. 2, a TME 200 may incorporate a free list engine 210 in some embodiments. The free list engine 210 manages and maintains a list of available ("free") memory locations (e.g., 275–276) in the first memory 203. In one embodiment, the free location head pointer register 212 is included in the free list engine 210 to point to the first available free memory location 275 in a list of free memory locations 275–276. The first available free memory location 275 is allocated to the next data entry to be inserted, unless some other occupied data entry location 272-274 becomes free first.

Figure 5:
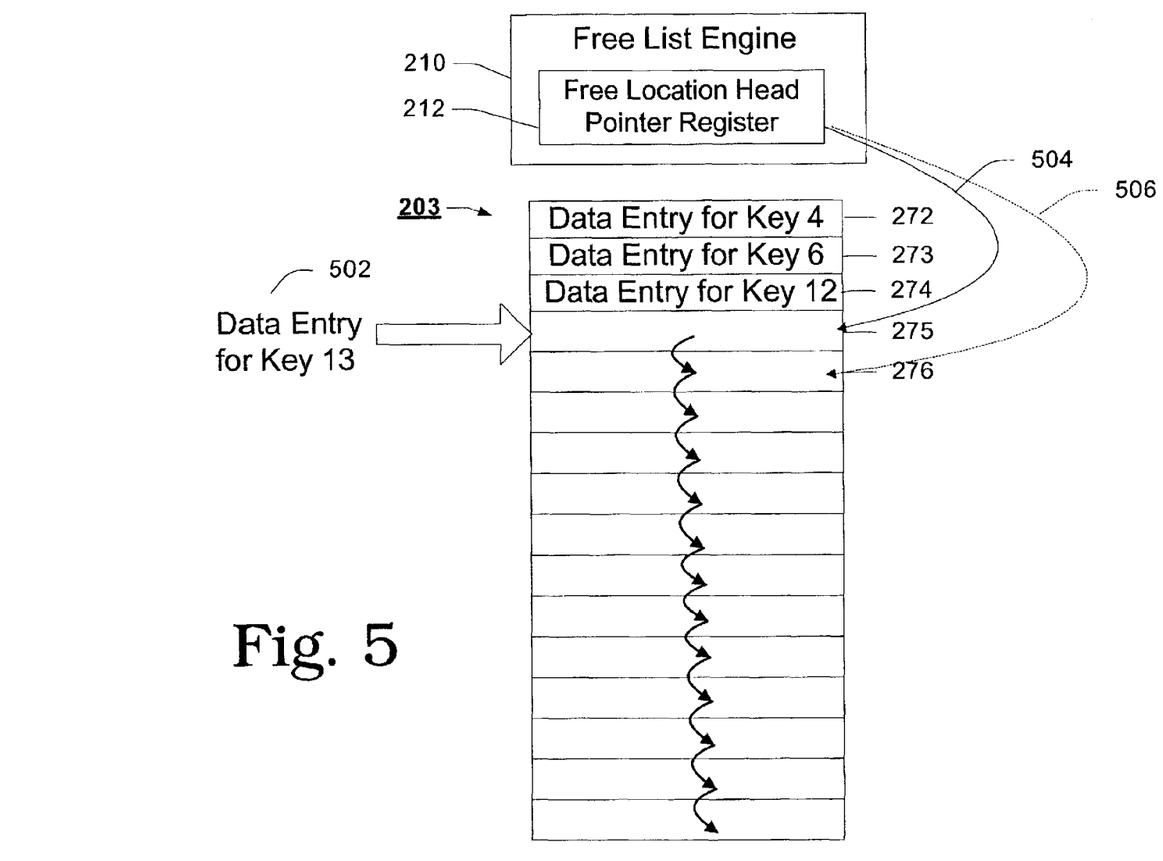
FIG. 5 is a graphical representation of an example linked-list of free data entry memory locations, in accordance with a data insertion embodiment of the invention.

In one embodiment, a linked-list of free memory locations 275–276 is used for storing data entries associated with keys. To illustrate example operations for maintaining the linked-list, FIG. 5 is a graphical representation of an example linked-list of free memory locations, in accordance with a data insertion aspect of the invention. A first memory 203 for storing data entries associated with keys, a free list engine 210, and a free location head pointer register 212 are example components that participate in maintaining the linked-list.

In an example data entry insertion, a data entry for key "13" 502 is inserted into the first available memory location 275. The address of the next free memory location 276 is transferred to the free location head pointer register 212 to update the head pointer 504 so that it no longer points to the now occupied memory location 275, but instead points 506 to the next free memory location 276 in the linked-list. The next free memory location 276 now becomes the first available free memory location.

Figure 6:
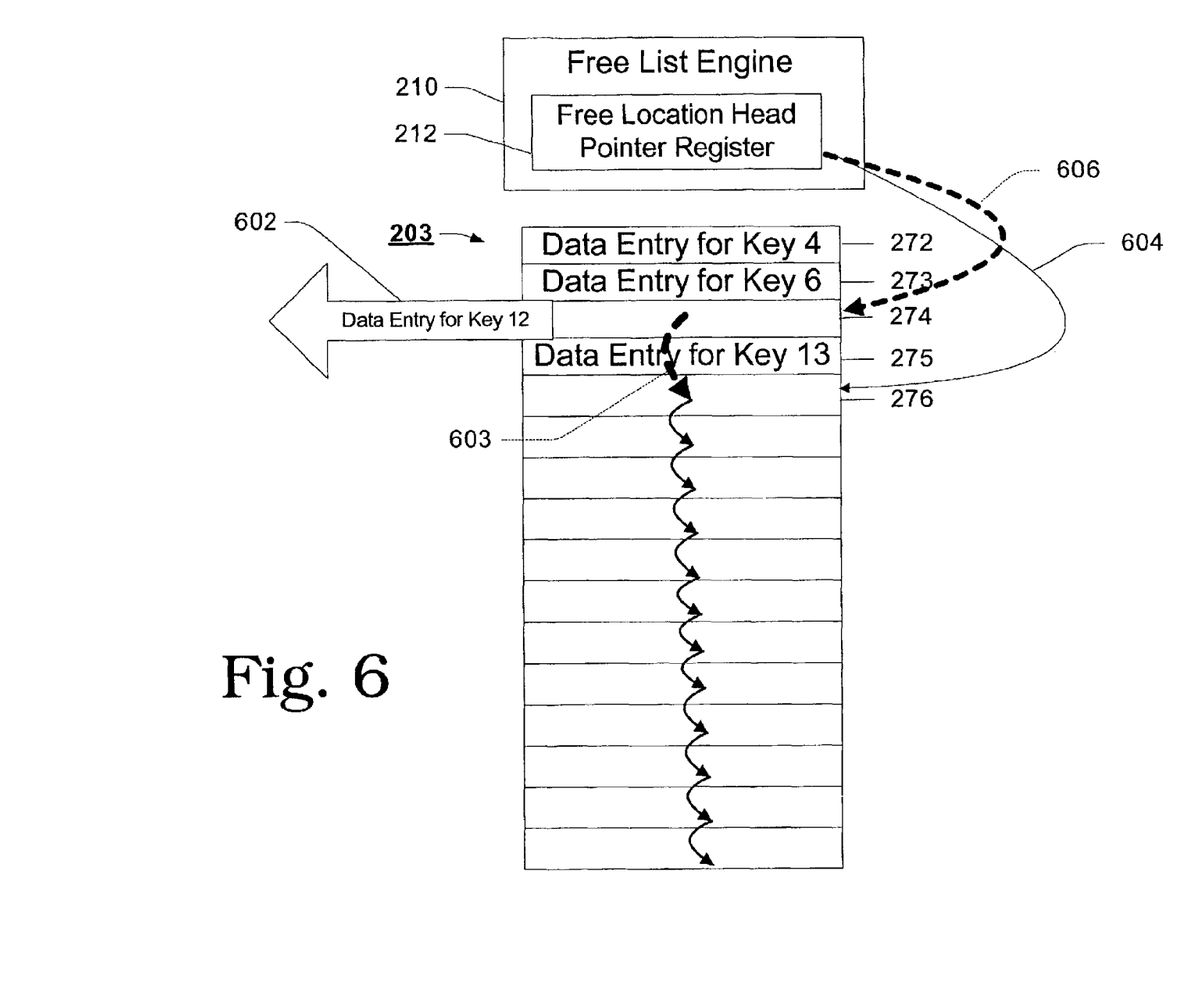
FIG. 6 is a graphical representation of an example linked-list of free data entry memory locations, in accordance with a data deletion embodiment of the invention.

Like the previous figure, FIG. 6 is a graphical representation of an example linked-list of free memory locations, in accordance with a data deletion aspect of the invention. The first memory 203 for storing data entries associated with keys, and a free list engine 210, having a free location head pointer register 212 are among the example components that participate in the operation.

To illustrate example dynamics for maintaining the linked-list of free memory locations during a data entry deletion, consider the state of the free location head pointer register 212 and the linked-list of free memory locations before the data entry deletion. The free location head pointer register 212 contains the address of the first available free memory location 276, represented by a pointer 604. The data entry deletion then occurs: the data entry for key "12" 602 is deleted from its memory location 274. The address of the first available free memory location 276 is copied from the free location head pointer register 212 into the newly emptied memory location 274, establishing a pointer 603 pointing from the newly emptied memory location 274 to the (former) first available free memory location 276. The address of the newly emptied memory location 274 is copied into the free location head pointer register 212. Thus, the newly emptied memory location 274 becomes the new first available free memory location at the head of the linked-list of free memory locations. The memory location from which the data entry is being deleted always becomes the first available free memory location at the head of the linked-list of free memory locations, in this embodiment.

Having described operations that can be performed by a TME 200, it will be appreciated by those having ordinary skill in the art that variations in the architecture of a TME 200 are allowable. For example the number of memory controllers 215 and the number of memories 203, 205 used can vary. The memory control function could also be integrated into the control element 214 instead of using a discrete memory controller 215. In some embodiments the first memory 203 and/or the second memory 205 may be totally or partially integrated with the TME 200, but in other embodiments the first memory 203 and second memory 205 can be separate from the TME 200, for instance when a TME 200 is retroactively implemented in a device or design already having memory that the TME 200 can use.

Although the apparatus embodiments have been described in terms of parts, modular blocks, and engines to facilitate description, one or more routines, subroutines, components, subcomponents, registers, processors, circuits, software subroutines, and/or software objects, or any combination thereof, could be substituted for one or several of the parts, modular blocks, and/or engines.

Methods

Once the reader 206 has obtained the content from the key 216, the TME 200 can perform various functions using the content, for example the TME 200 can perform a key 216 existence search, a data entry retrieval using the key, a key 216 (and associated data entry) insertion, and key 216 (and associated data entry) deletion. Each of the four aforementioned operations will be discussed below.

Performing a Key Lookup/Data Entry Retrieval

Performing a key 216 lookup and performing a data entry retrieval based on a retrieved key 216 are similar. For illustrative purposes, it will be assumed that some data entries (in locations 272, 273, 274) and some related pointers 224, 226, 228 are already present in the tables 203, 205, although initially, before any data insertions, the second table 205 would be empty of pointers and have all validity bits set to "invalid." Likewise, in an initial state, the first table 203 would have all its memory locations free, and in one embodiment, linked together in a linked-list.

Figure 7:
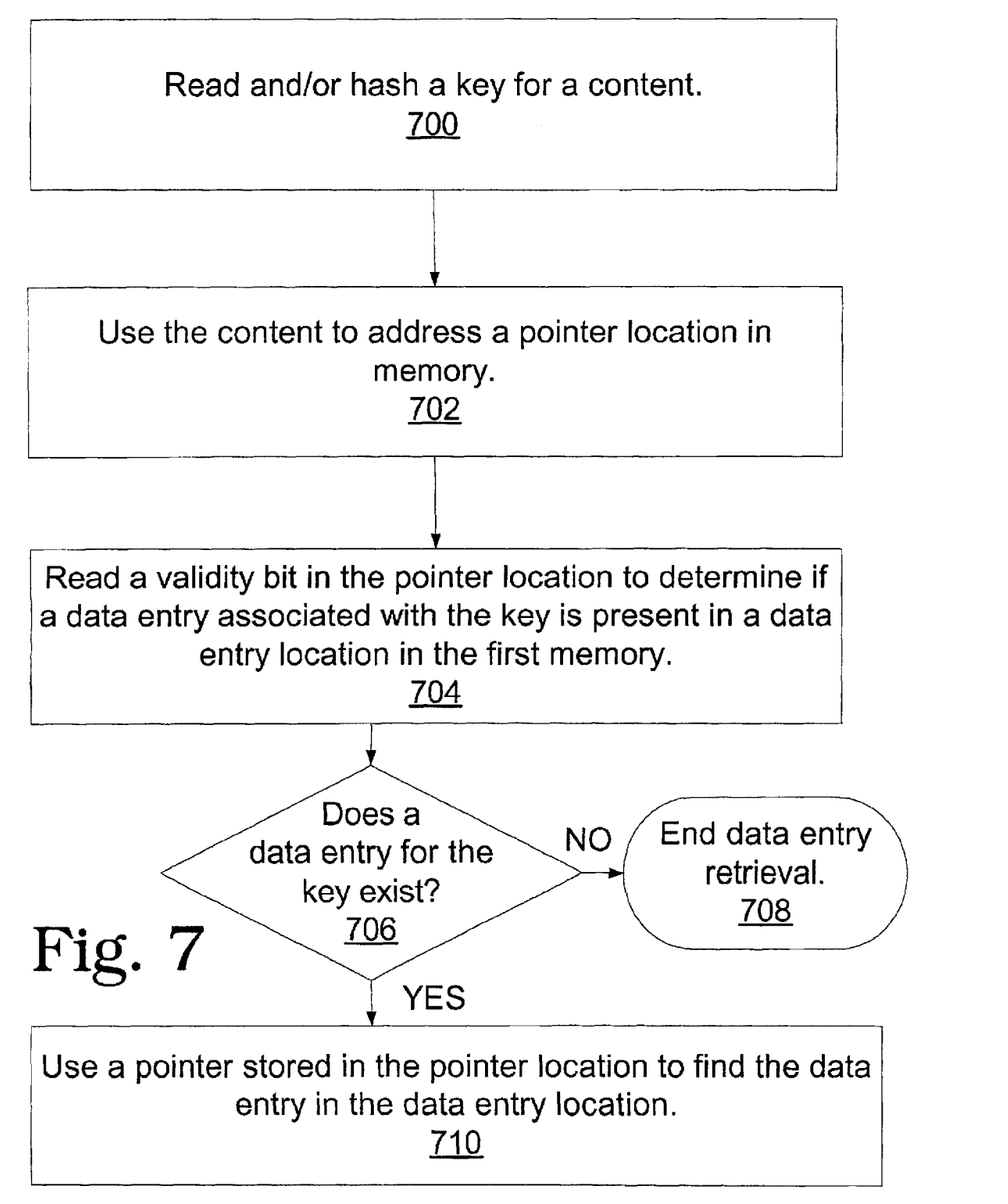
FIG. 7 is a flowchart of an example data entry retrieval method, according to one embodiment of the invention.

FIG. 7 is a flowchart of an example data retrieval method, according to one aspect of the invention. First, a key is read and/or hashed for a content 700. A pointer memory location corresponding to the content is addressed using the content 702. A validity bit in the pointer memory location is read to determine if a data entry associated with the key is present in a first location in a first memory 704, 706. If the validity bit indicates that a data entry for the key is not present, the data entry retrieval ends 708. If the validity bit indicates that a data entry for the key is present, then a pointer stored in the pointer memory location is used to find the data entry in the first location 710. The method is particularly suitable for managing a VLAN rule table, in which case the key is a VLAN tag and each data entry is a VLAN rule.

A TME 200 may be used to perform the method described above.

In accordance with one aspect of the invention, when a key 216 is received by the TME 200 the second memory 205 is arranged and/or selected so that the logical and/or physical position of each memory location 238-262 corresponds to the content of the key 216. Each physical and/or logical position (e.g., 238-262) in the second memory 205 stores a pointer and a validity bit that correspond to the content of a possible key 216 that could be received. The content of the key describes or represents a physical and/or logical position in the table/memory. Thus, after the key 216 is read and/or hashed by the reader 206, the executive table engine 208 can proceed directly to the proper location in the second memory 205 using the key content as an address.

For both the key lookup and the data entry retrieval operations, the executive table engine 208 proceeds to the location in the second memory 205 indicated by the content of the key 216 and reads a validity bit stored at the given location to determine if a pointer directed to a data entry for the key 216 has been stored there. If only a key lookup is being performed and the validity bit is "true," that is, the validity bit indicates that a valid data entry for the key 216 is present, then the key lookup operation is complete and requires no further action. In other words, for key lookups, which test for the mere presence of the key 216, or a representation of the key, the operation does not have to proceed any further than reading the validity bit. A data entry retrieval operation, however, requires additional action.

For a data retrieval operation, once the validity bit in the location corresponding to the content of the key 216 indicates the presence of a pointer for the key 216, then the pointer is followed to a data entry for the key in a data entry location in the first memory 203. For example, if the key 216 content is "4," the executive table engine 208 proceeds to memory location "4" 246 of the second memory 205 and reads the validity bit stored at memory location "4" 246 which, in the illustrated example is set to true ("1") indicating the presence of a valid pointer 224 for the key 216. The pointer 224 directs the executive table engine 208 to the data entry stored at the memory location 272 of the first memory 203. The executive table engine 208 can then retrieve the data entry.

Although in this embodiment a validity bit value of "1" indicates the existence of a data entry for the key 216 in the first memory 203 and a "0" indicates the absence of a data entry, in other embodiments the inverse may well be true, where "0" is used to indicate validity and "1" used to indicate invalidity.

Performing a Key Insertion or Deletion

The TME 200 can perform data entry 290 insertion or data entry 290 deletion operations in addition to the key lookup and data entry retrieval operations described above. Although a TME 200 can be used with a static table of data entries, the insertion and deletion operations may be used in many types of applications that require a table of dynamically changing data entries, not just a static table with a fixed number of data entries.

Figure 8:
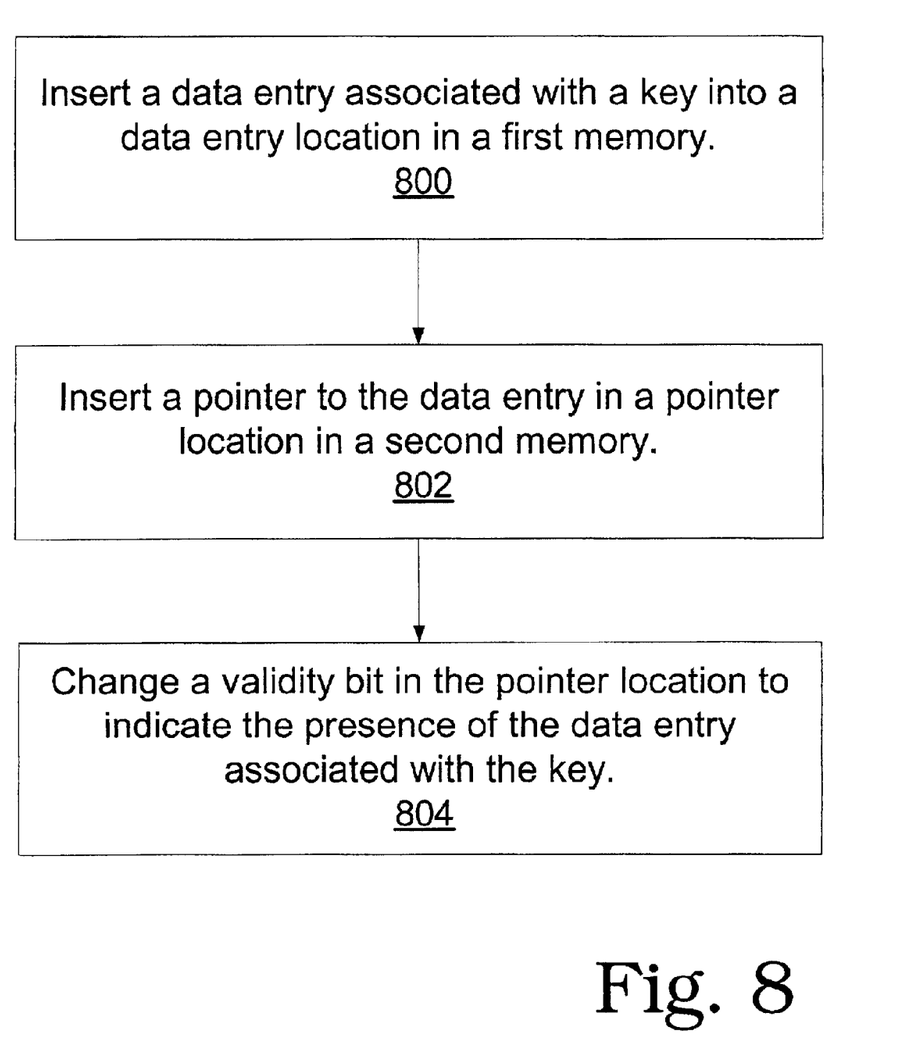
FIG. 8 is a flowchart of an example key insertion method, according to one embodiment of the invention.

FIG. 8 is a flowchart of an example method for performing a "key insertion," according to one aspect of the invention, that is, inserting a data entry for the key and setting a pointer to the data entry in a memory location representing the key. Thus, the key insertion method is a method for building a data table. A data entry associated with a key is inserted in a first location of a first memory to begin building a table of data entries 800. The data entry may be inserted by an executive table engine 208 of a TME 200. Specifically, the data entry inserter/deleter 408 of the TME 200 can be used to perform the insertion. A pointer to the data entry is inserted in a second location in a second memory to begin building a table of pointers 802. The second location is selected so that a content of the key gives the address and/or position of the second location directly without a search through a list of keys or other entries. Hence, the address and/or position of the second location represents a content of the key. A pointer engine 404 component of the executive table engine 208 may be used to perform the pointer insertion. A validity bit in the second location is set to indicate the presence of the data entry associated with the key 804. The pointer engine 404 may also be used to set the validity bit.

Using a key with a content of "4" as an example for data entry 290 insertion, the TME 200 first performs the key 216 lookup operation discussed above and reads the validity bit in the memory location 246 representing the key 216 to determine whether a data entry is currently stored for the key 216. Once it has determined that no data entry is already stored for the key 216, the TME 200 receives the data entry 290 to be inserted and the executive table engine 208 stores the data entry 290 in the first available free memory location 272 in the first memory 203. If a list is being kept of free memory locations for data entries, then the memory location used by the inserted data entry is deleted from the list and the free list engine 210 reestablishes a new first available free location. The executive table engine 208 then places a pointer 224 pointing to the stored data entry into the memory location 246 in the second memory 205; the memory location 246 corresponding to the content "4" of the key 216. Since the memory location 272 receiving the data entry 290 has an address of "0000000000," the pointer 224 consists of address "0000000000." Finally, the executive table engine 208 sets the validity bit for the memory location 246 where the new pointer resides to "valid," indicating that a valid data entry has been placed for the key 216 with content "4."

In this embodiment, the validity bit is set last in case an error occurs during the operation, so that the value of the validity bit gives as accurate an indication as possible of the presence or absence of a data entry for a given key. An error will result in the validity bit remaining in an "invalid" state, indicating no data entry for the key 216.

In one embodiment, the data entry deletion operation follows a sequence similar to the insertion sequence, except that a data entry and a pointer are removed instead of inserted.

Figure 9:
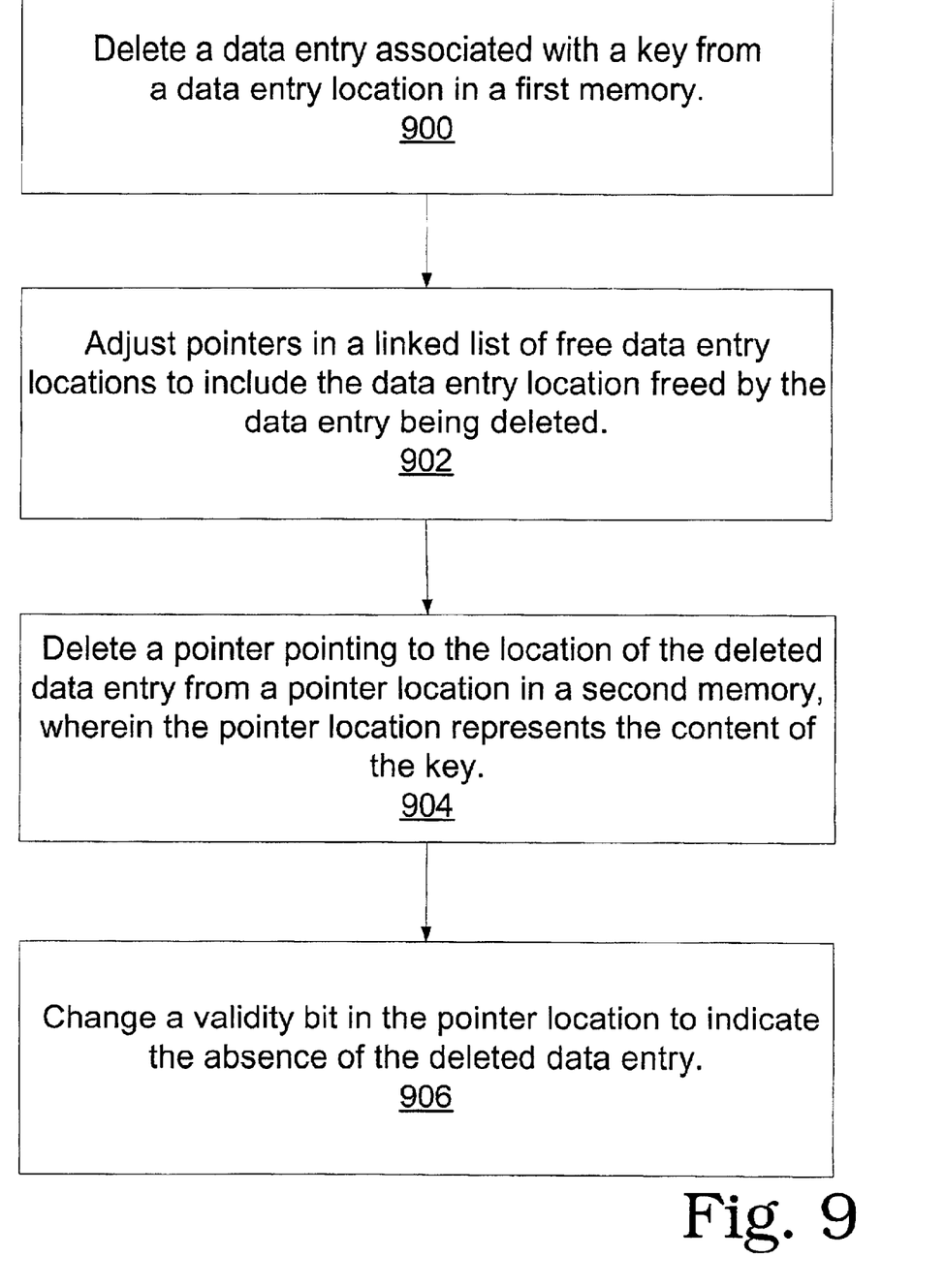
FIG. 9 is a flowchart of an example data entry deletion method, according to one embodiment of the invention.

FIG. 9 is a flowchart of an example data deletion method, according to one aspect of the invention. The data entry associated with a key is deleted from a data entry location in a first memory 900. Pointers in a linked-list of free data entry locations are adjusted to include the data entry location freed by the data entry being deleted 902. A pointer to the data entry just removed is deleted from a pointer location in a second memory, wherein the pointer location represents the content of the key 904. Then, a validity bit in the pointer location is set to indicate the absence of a data entry associated with the key 906.

A TME 200 may be used to perform the method for deleting a data entry. Using a key 216 with content "4" as an example, the data entry residing at memory location 272 is deleted by the executive table engine 208. The pointer 224 from the memory location 246 in the second memory 205 is also removed. The newly freed memory location 272 in the first memory 203 is reintegrated into the list of free data entry memory locations (e.g., memory locations 275–276 and others in the table 203 that are empty). Lastly, the validity bit at the memory location 246 is set to indicate the absence of a data entry for the particular key 216. The reintegration of the freed memory location 272 into the list of free data entry memory locations 275–-276 may vary in its timing relative to the deletion of a data entry and a pointer. However, in this embodiment, the reintegration of the freed memory space (272 if the data entry there is being deleted) into the list of free data entry memory locations 275–276 is carried out dynamically as pointers to and from the data entry being deleted are rearranged, and is carried out by the free list engine 210.

Alternate Embodiment

Figure 10:
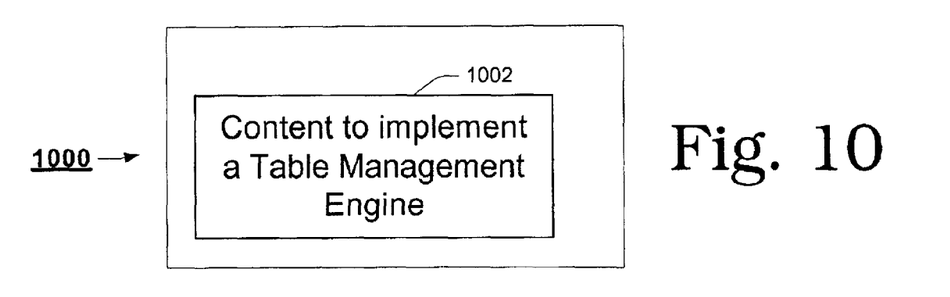
FIG. 10 is a graphical representation of an example storage medium comprising content which, when executed, causes an accessing machine to implement one or more embodiments, aspects, and/or methods of a TME.

FIG. 10 is a graphical representation of an article of manufacture comprising a machine-readable medium 1000 having content 1002, that causes a host device to implement one or more embodiments, aspects, and/or methods of a table management engine of the invention. The content may be instructions, such as computer instructions, or may be design information allowing implementation. The content causes a machine to implement a method and/or apparatus of the invention, including inserting a data entry associated with a key in a data entry location 272 of a first memory 203, inserting a pointer 224 to the data entry in a pointer location in a second memory 205, wherein the address and/or position of the pointer location 246 represents a content of the key, and setting a validity bit in the pointer location 246 to indicate the presence of the data entry associated with the key in the data entry location 272.

The key received by the hosting machine may be a 12-bit VLAN tag. The hosting machine may implement a VLAN rule table having a 1 K VLAN rule RAM, wherein each VLAN rule is the data entry for a key. When a VLAN rule is stored in the 1 K rule RAM, a pointer to the VLAN rule is placed in a second RAM, specifically a 4 K pointer RAM, at a location in the 4 K pointer RAM representing the content of the key. In order to utilize the entire 1 K VLAN rule RAM, the pointer is ten bits in length. A validity bit is also stored at the pointer location in the 4 K pointer RAM to indicate whether a valid VLAN rule is present for a given key content. Thus, the TME implemented by the machine addresses the 4 K pointer RAM quickly using the content of a received VLAN tag, and quickly ascertains the presence or absence of a valid VLAN rule for the key by merely reading the validity bit. The high speed of the TME implemented by the machine is accomplished without the special hardware requirements and/or design complexity of a CAM chip.

The methods and apparatuses of the invention may be provided partially as a computer program product that may include the machine-readable medium. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media suitable for storing electronic instructions. Moreover, parts may also be downloaded as a computer program product, wherein the program may be transferred from a remote computer to a requesting computer by way of data signals embodied in a carrier wave or other propagation media via a communication link (e.g., a modem or network connection). In this regard, the article of manufacture may well comprise such a carrier wave or other propagation media.

While the invention has been described in terms of several embodiments, those skilled in the art will recognize that the invention is not limited to the embodiments described but can be practiced with modification and alteration within the spirit and scope of the appended claims. The description is thus to be regarded as illustrative instead of limiting.

What is claimed is:

1. An apparatus, comprising:
    a reader to read and/or hash a key to determine a key content; and
    an executive table engine to:
        receive the key content from the reader,
        store a data entry associated with the key in a data location in memory,
        assign a pointer to the data location,
        store the pointer in a pointer location in memory, wherein the memory address of the pointer location is the key content, and
        set a validity bit in the pointer location to indicate the presence of the data entry in the data location.

2. The apparatus of claim 1, wherein the executive table engine is configured to delete the data entry from the data location, delete the pointer from the pointer location, and reset the validity bit.

3. The apparatus of claim 1, further comprising a free list engine to manage a list of free memory locations for data entries, and a head pointer register to maintain free memory location pointers within a linked-list of the free memory locations.

4. The apparatus of claim 1, the executive table engine further comprising:
    a key indexer to find the pointer location based on the key content and to read the validity bit in the pointer location;
    a data entry retriever to retrieve the data entry if the validity bit indicates the presence of the data entry associated with the key;
    a data entry inserter/deleter the data entry in the data location; and
    a pointer engine to insert/delete the pointer and set/reset the validity bit associated with the pointer location.

5. A method, comprising:
    reading and/or hashing a key to determine a key content;
    inserting a data entry associated with a key in a data location in a first memory;
    inserting a pointer to the data location in a pointer location in a second memory, wherein the memory address of the pointer location is the key content; and
    setting a validity bit in the pointer location to indicate the presence of the data entry associated with the key.

6. The method of claim 5, wherein the depth of the first memory is based on a pointer length used in the second memory.

7. The method of claim 5, wherein empty data locations in the first memory are linked together in a list of free data locations.

8. The method of claim 7, further comprising pointing to a first free data location in the list of free data locations using a head pointer register.

9. The method of claim 8, wherein the first free data location for inserting the data entry is unlinked from the list of free data locations by updating the head pointer to point to a next free data location.

10. The method of claim 5, wherein a ten bit pointer length is used in the second memory and 1024 memory locations are used in the first memory.

11. The method of claim 10, wherein the key is a virtual local area network (VLAN) tag and the data entry is a VLAN rule.

12. A method, comprising:
    reading and/or hashing a key to determine a key content;
    reading a validity bit in a pointer location in memory to determine if a data entry associated with the key is present in a data location in memory, wherein the memory address of the pointer location is the key content; and
    following a pointer in the pointer location to the data entry if the validity bit indicates the presence of the data entry in memory.

13. The method of claim 12, wherein the key is a VLAN tag and the data entry is a VLAN rule.

14. A method, comprising:
    inserting a data entry associated with a key into a free location in a data memory;
    adjusting one or more pointers to exclude the free data location from a linked-list of free data locations;
    inserting a pointer to the data location into a pointer location in memory, wherein the memory address of the pointer location is the key content; and
    setting a validity bit in the pointer location to indicate the presence of the data entry associated with the key.

15. The method of claim 14, wherein the key is a VLAN tag and the data entry is a VLAN rule.

16. A method, comprising:
    deleting a data entry associated with a key from a location in a data memory;
    adjusting one or more free memory location pointers to include the data location in a linked-list of free data locations;
    deleting a pointer to the data entry from a pointer location in memory, wherein the memory address of the pointer location is a key content of an associated key; and
    resetting a validity bit in the data entry pointer location to indicate the absence of the data entry associated with the key.

17. The method of claim 16, wherein the key is a VLAN tag and the data entry is a VLAN rule.

18. An article of manufacture, comprising:
    a machine-readable medium containing content that, when executed, causes an accessing machine to:
    read and/or hash a key to determine a key content;
    store a data entry associated with the key in a data location in a first memory;
    store a pointer to the data location and set a validity bit in a pointer location in a second memory, wherein the memory address of the pointer location is the key content and the validity bit indicates the presence of the pointer in the pointer location; and
    delete the pointer, delete the data entry, and reset the validity bit to indicate the absence of the pointer in the pointer location.

19. The article of manufacture of claim 18, wherein the content causes the accessing machine to read the validity bit in a pointer location addressed by the key content and retrieve the data entry if the validity bit indicates the presence of a data entry associated with the key.

20. The article of manufacture of claim 18 wherein the content causes the accessing machine to manage free locations for a data entry in the first memory and maintain pointers within a linked-list of the free locations.

21. A computing system, comprising:
a table management engine to:
store a data entry associated with a key in a data location in memory,
store a pointer to the data location in a pointer location in memory, wherein the memory address of the pointer location is a key content,
set a validity bit in the pointer location to indicate the presence of the data entry in the data location; and
at least one memory to store the data entry, the pointer, and the validity bit.

22. The computing system of claim 21, further comprising:

a reader to read and/or hash the key to determine a key content;
a key indexer to find the pointer location based on the key content and read the validity bit in the pointer location;
a data entry retriever to retrieve the data entry if the validity bit indicates the presence of the data entry associated with the key;
a data entry inserter/deleter to insert/delete the data entry in the data location; and
a pointer engine to insert/delete the pointer and set/reset the validity bit associated with the pointer location.

23. The computing system of claim 21, further comprising a free list engine to manage a list of free memory locations for the data entries including a head pointer register to maintain free memory location pointers within the list of the free memory locations.

* * * * *

UNITED STATES PATENT AND TRADEMARK OFFICE
CERTIFICATE OF CORRECTION

PATENT NO. : 6,842,791 B2
DATED : January 11, 2005
INVENTOR(S) : Navada et al.

It is certified that error appears in the above-identified patent and that said Letters Patent is hereby corrected as shown below:

Column 4,
Line 60, after "FIG. 2", delete "is".

Column 5,
Line 66, before "RAM", delete "20".

Column 11,
Line 44, after "inserter/deleter", insert -- to insert/delete --.

Signed and Sealed this

Fourteenth Day of June, 2005

JON W. DUDAS
*Director of the United States Patent and Trademark Office*